(12) United States Patent
Dai et al.

(10) Patent No.: US 9,958,162 B2
(45) Date of Patent: May 1, 2018

(54) COMBUSTOR ASSEMBLY FOR A TURBINE ENGINE

(71) Applicant: United Technologies Corporation, Hartford, CT (US)

(72) Inventors: Zhongtao Dai, Manchester, CT (US); Jeffrey M. Cohen, Hebron, CT (US); Kristin Kopp-Vaughan, East Hartford, CT (US); James B. Hoke, Tolland, CT (US)

(73) Assignee: United Technologies Corporation, Farmington, CT (US)

( * ) Notice: Subject to any disclaimer, the term of this patent is extended or adjusted under 35 U.S.C. 154(b) by 132 days.

(21) Appl. No.: 14/335,334

(22) Filed: Jul. 18, 2014

(65) Prior Publication Data

US 2015/0219338 A1  Aug. 6, 2015

Related U.S. Application Data

(63) Continuation-in-part of application No. 13/012,212, filed on Jan. 24, 2012, now Pat. No. 9,068,748.

(51) Int. Cl.
  *F23R 3/34* (2006.01)
  *F23R 3/50* (2006.01)
  *F02C 7/22* (2006.01)
  *F23R 3/06* (2006.01)

(52) U.S. Cl.
  CPC ............... *F23R 3/346* (2013.01); *F02C 7/22* (2013.01); *F23R 3/06* (2013.01); *F23R 3/34* (2013.01); *F23R 3/50* (2013.01); *F23R 2900/00013* (2013.01); *F23R 2900/00014* (2013.01)

(58) Field of Classification Search
  CPC ..... F23R 3/346; F23R 3/34; F23R 3/50; F23R 2900/00013; F23R 2900/00014
  See application file for complete search history.

(56) References Cited

U.S. PATENT DOCUMENTS

| | | | |
|---|---|---|---|
| 2,268,464 | A | 12/1941 | Seippel |
| 3,934,409 | A | 1/1976 | Quillevere et al. |
| 4,260,467 | A | 4/1981 | Markowski et al. |
| 4,265,615 | A | 5/1981 | Lohmann et al. |
| 4,420,929 | A | 12/1983 | Jorgensen et al. |
| 4,787,208 | A | 11/1988 | DeCorso |
| 4,910,957 | A | 3/1990 | Moreno et al. |
| 4,936,090 | A * | 6/1990 | Shekleton ............... F02C 7/26 60/746 |
| 4,984,631 | A | 1/1991 | Reesing |
| 5,253,474 | A | 10/1993 | Correa et al. |

(Continued)

FOREIGN PATENT DOCUMENTS

| | | |
|---|---|---|
| DE | 19631616 | 2/1998 |
| EP | 0544350 | 6/1993 |

(Continued)

OTHER PUBLICATIONS

EP search report for EP15001486.8 filed Nov. 25, 2015.

*Primary Examiner* — Andrew Nguyen
(74) *Attorney, Agent, or Firm* — O'Shea Getz P.C.

(57) ABSTRACT

A combustor assembly includes a first wall, a second wall, a bulkhead and a plurality of fuel injectors. The bulkhead forms a combustion chamber with the first and the second walls. The fuel injectors are configured with the first wall in a unique and/or a fluctuating pattern.

4 Claims, 9 Drawing Sheets

(56) References Cited

U.S. PATENT DOCUMENTS

| | | | |
|---|---|---|---|
| 5,289,677 A | 1/1994 | Jarrell | |
| 5,285,631 A | 2/1994 | Bechtel et al. | |
| 5,317,864 A * | 6/1994 | Shorb | F23R 3/28 |
| | | | 60/740 |
| 5,435,139 A | 7/1995 | Pidcock et al. | |
| 5,490,380 A | 2/1996 | Marshall | |
| 5,592,819 A | 1/1997 | Ansart et al. | |
| 5,628,192 A | 5/1997 | Hayes-Bradley et al. | |
| 5,640,851 A | 6/1997 | Toon et al. | |
| 5,680,765 A * | 10/1997 | Choi | F23C 7/004 |
| | | | 239/434 |
| 5,687,571 A | 11/1997 | Althaus et al. | |
| 5,749,219 A * | 5/1998 | Dubell | F02C 7/26 |
| | | | 60/733 |
| 5,758,503 A | 6/1998 | DuBell et al. | |
| 5,782,294 A | 7/1998 | Foremming et al. | |
| 5,761,148 A | 8/1998 | Burrus | |
| 5,797,267 A | 8/1998 | Richards | |
| 5,934,067 A | 8/1999 | Ansart et al. | |
| 5,966,926 A * | 10/1999 | Shekleton | F02C 7/232 |
| | | | 60/39.094 |
| 5,983,642 A | 11/1999 | Parker et al. | |
| 6,047,539 A | 4/2000 | Farmer | |
| 6,070,412 A | 6/2000 | Ansart et al. | |
| 6,105,360 A | 8/2000 | Willis | |
| 6,182,451 B1 | 2/2001 | Hadder | |
| 6,189,814 B1 | 2/2001 | Richards | |
| 6,240,731 B1 | 6/2001 | Hoke et al. | |
| 6,378,286 B2 | 4/2002 | Vermes et al. | |
| 6,470,685 B2 | 10/2002 | Pidcock et al. | |
| 6,571,566 B1 | 6/2003 | Temple et al. | |
| 6,606,861 B2 | 8/2003 | Snyder | |
| 6,701,714 B2 | 3/2004 | Burd et al. | |
| 6,763,664 B2 | 7/2004 | Aoyama | |
| 6,810,673 B2 | 11/2004 | Snyder | |
| 7,007,481 B2 | 3/2006 | McMasters | |
| 7,093,439 B2 | 8/2006 | Pacheco-Tougas et al. | |
| 7,093,441 B2 | 8/2006 | Burd et al. | |
| 8,037,688 B2 | 10/2011 | Hagen | |
| 8,312,724 B2 | 11/2012 | Dai | |
| 2002/0116929 A1 | 8/2002 | Snyder | |
| 2002/0148228 A1 | 10/2002 | Kraft et al. | |
| 2003/0061817 A1 | 4/2003 | Aoyama | |
| 2003/0101731 A1 | 6/2003 | Burd et al. | |
| 2003/0167771 A1 | 9/2003 | Hayashi et al. | |
| 2003/0213250 A1 | 11/2003 | Pacheco-Tougas et al. | |
| 2003/0233832 A1 | 12/2003 | Martling et al. | |
| 2004/0006995 A1 | 1/2004 | Snyder | |
| 2004/0226229 A1 | 11/2004 | Drnevich | |
| 2004/0231333 A1 | 11/2004 | Tiemann | |
| 2005/0022531 A1 | 2/2005 | Burd | |
| 2005/0086940 A1 | 4/2005 | Coughlan et al. | |
| 2005/0086944 A1 | 4/2005 | Cowan | |
| 2008/0078160 A1 | 4/2008 | Kraemer et al. | |
| 2008/0264033 A1 * | 10/2008 | Lacy | F23R 3/286 |
| | | | 60/39.49 |
| 2009/0084082 A1 * | 4/2009 | Martin | F01D 9/023 |
| | | | 60/39.281 |
| 2010/0162710 A1 * | 7/2010 | Senior | F23R 3/34 |
| | | | 60/737 |
| 2010/0170254 A1 * | 7/2010 | Venkataraman | F02C 7/228 |
| | | | 60/746 |
| 2011/0314824 A1 * | 12/2011 | Cheung | F23R 3/14 |
| | | | 60/737 |
| 2012/0186262 A1 | 7/2012 | Hoke | |
| 2013/0318991 A1 | 12/2013 | DiCintio et al. | |
| 2014/0007578 A1 | 1/2014 | Genin et al. | |
| 2014/0007579 A1 * | 1/2014 | Ainslie | F23R 3/28 |
| | | | 60/746 |
| 2014/0090391 A1 * | 4/2014 | Burd | F23R 3/346 |
| | | | 60/772 |
| 2014/0260303 A1 * | 9/2014 | Davis, Jr. | F23R 3/346 |
| | | | 60/776 |

FOREIGN PATENT DOCUMENTS

| | | |
|---|---|---|
| EP | 1515090 | 3/2005 |
| EP | 1522792 | 4/2005 |
| EP | 1775516 | 4/2007 |
| FR | 2694799 | 2/1994 |
| GB | 818634 | 8/1959 |
| GB | 2278431 | 11/1994 |
| GB | 2384046 | 7/2003 |
| GB | 2390890 | 1/2004 |
| JP | 4139312 | 5/1992 |
| WO | 2008127437 | 10/2008 |

\* cited by examiner

COMBUSTOR ASSEMBLY FOR A TURBINE ENGINE

CROSS-REFERENCE TO RELATED APPLICATIONS

This application claims priority to and is a continuation-in-part of U.S. patent application Ser. No. 13/012,212 filed Jan. 24, 2011, which is hereby incorporated herein by reference in its entirety.

This invention was made with government support under Contract No. NNC13TA45T awarded by the United States National Aeronautics and Space Administration (NASA). The government may have certain rights in the invention.

BACKGROUND OF THE INVENTION

1. Technical Field

This disclosure relates generally to a turbine engine and, more particularly, to a combustor for a turbine engine.

2. Background Information

A turbine engine may include an annular combustor. A typical annular combustor includes a bulkhead connected radially between an inner wall and an outer wall. The inner and the outer walls extend axially from the bulkhead thereby defining a combustion chamber radially therebetween. A plurality of circumferentially disposed fuel injectors are configured with the bulkhead. Each of these fuel injectors injects fuel into the combustion chamber for mixing with core air and combustion.

There is a need in the art for an improved turbine engine combustor.

SUMMARY OF THE DISCLOSURE

According to an aspect of the invention, a combustor assembly includes a first wall, a second wall, a bulkhead and a plurality of fuel injectors. The bulkhead forms a combustion chamber with the first and the second walls. The fuel injectors are configured with the first wall in a fluctuating pattern.

According to another aspect of the invention, another combustor assembly includes a first wall, a second wall, a bulkhead, a plurality of upstream fuel injectors and a plurality of downstream fuel injectors. The bulkhead forms a combustion chamber with the first and the second walls. The upstream fuel injectors are configured with the bulkhead in a first pattern. The downstream fuel injectors are configured with the first wall in a second pattern, which is different than the first pattern.

According to still another aspect of the invention, an assembly is provided for a turbine engine. This turbine engine assembly includes a combustor with a combustion chamber extending circumferentially around and axially along a centerline. The combustor includes a plurality of fuel injectors disposed about the centerline. The fuel injectors are adapted to unevenly injected fuel radially into the combustion chamber.

The fuel injectors may be arranged circumferentially about an axial centerline. The fluctuating pattern may be an axially and/or circumferentially fluctuating pattern. For example, the may be axial and/or circumferential fluctuations in the pattern.

A first adjacent pair of the fuel injectors may be separated by a first distance. A second adjacent pair of the fuel injectors may be separated by a second distance that is different than the first distance.

At least some of the fuel injectors may be grouped into a plurality of multi-fuel injector sets. Adjacent pairs of the multi-fuel injector sets may each be separated by a first distance. An adjacent pair of the fuel injectors in each of the multi-fuel injector sets may be separated by a second distance that is different than the first distance.

At least one of the fuel injectors may be arranged between a first of the adjacent pairs of the multi-fuel injector sets.

The fuel injectors may be arranged circumferentially about an axial centerline. A first of the fuel injectors may be axially offset from a second of the fuel injectors.

A plurality of second fuel injectors may be included and configured with the bulkhead. One of the fuel injectors may be circumferentially aligned with one of the second fuel injectors.

A plurality of second fuel injectors may be included and configured with the bulkhead. One of the fuel injectors may be circumferentially positioned between an adjacent pair of the second fuel injectors. Another one of the fuel injectors may be circumferentially aligned with one of the second fuel injectors.

One of the fuel injectors may be adapted to inject fuel into the combustion chamber at a first rate. Another one of the fuel injectors may be adapted to inject fuel into the combustion chamber at a second rate that is different than the first rate.

The first pattern may be a circumferential first pattern. The second pattern may be a circumferential second pattern that is different than the circumferential first pattern.

A quantity of the downstream fuel injectors may be greater than, less than or substantially equal to a quantity of the upstream fuel injectors.

One of the downstream fuel injectors may be circumferentially aligned with one of the upstream fuel injectors.

One of the downstream fuel injectors may be circumferentially positioned between an adjacent pair of the upstream fuel injectors.

One of the fuel injectors may be adapted to inject fuel into the combustion chamber at a first rate. Another one of the fuel injectors may be adapted to inject fuel into the combustion chamber at a second rate that is different than the first rate.

The fuel injectors may be arranged in a fluctuating pattern.

The foregoing features and the operation of the invention will become more apparent in light of the following description and the accompanying drawings.

DETAILED DESCRIPTION OF THE INVENTION

Figure 1:
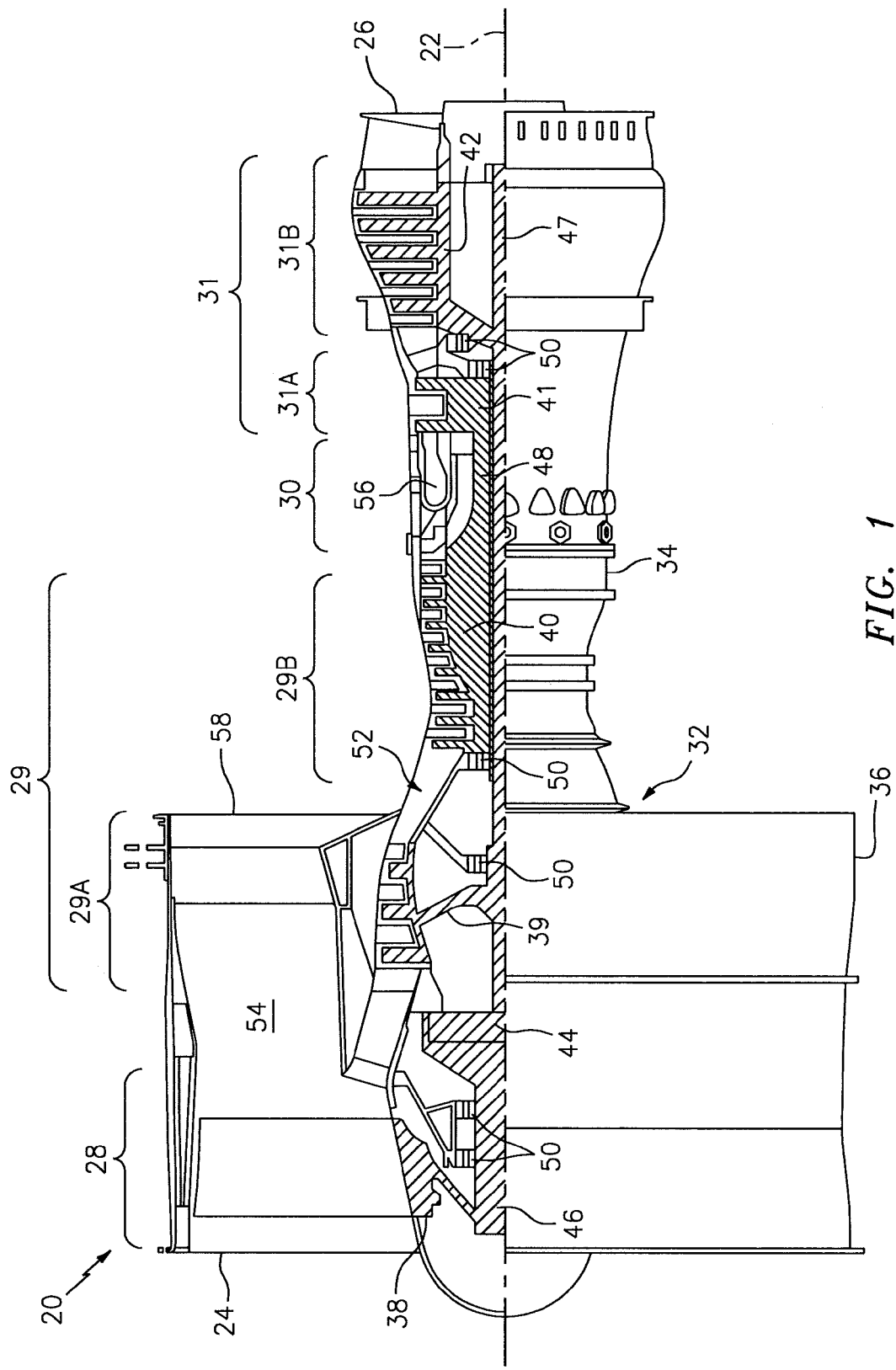
FIG. 1 is a side cutaway illustration of a geared turbine engine.

FIG. 1 is a side cutaway illustration of a geared turbine engine 20. This turbine engine 20 extends along an axial centerline 22 between an upstream airflow inlet 24 and a downstream airflow exhaust 26. The turbine engine 20 includes a fan section 28, a compressor section 29, a combustor section 30 and a turbine section 31. The compressor section 29 includes a low pressure compressor (LPC) section 29A and a high pressure compressor (HPC) section 29B. The turbine section 31 includes a high pressure turbine (HPT) section 31A and a low pressure turbine (LPT) section 31B.

The engine sections 28-31 are arranged sequentially along the centerline 22 within an engine housing 32. This housing 32 includes an inner case 34 (e.g., a core case) and an outer case 36 (e.g., a fan case). The inner case 34 houses the engine sections 29-31; e.g., an engine core. The outer case 36 houses the fan section 28 and axially overlaps a forward portion of the inner case 34.

Each of the engine sections 28, 29A, 29B, 31A and 31B includes a respective rotor 38-42. Each of these rotors 38-42 includes a plurality of rotor blades arranged circumferentially around and connected to one or more respective rotor disks. The rotor blades, for example, may be formed integral with or mechanically fastened, welded, brazed, adhered and/or otherwise attached to the respective rotor disk(s).

The fan rotor 38 is connected to a gear train 44, for example, through a fan shaft 46. The gear train 44 and the LPC rotor 39 are connected to and driven by the LPT rotor 42 through a low speed shaft 47. The HPC rotor 40 is connected to and driven by the HPT rotor 41 through a high speed shaft 48. The shafts 46-48 are rotatably supported by a plurality of bearings 50; e.g., rolling element and/or thrust bearings. Each of these bearings 50 is connected to the engine housing 32 by at least one stationary structure such as, for example, an annular support strut.

During operation, air enters the turbine engine 20 through the airflow inlet 24, and is directed through the fan section 28 and into a core gas path 52 and a bypass gas path 54. The air within the core gas path 52 may be referred to as "core air". The air within the bypass gas path 54 may be referred to as "bypass air". The core air is directed through the engine sections 29-31, and exits the turbine engine 20 through the airflow exhaust 26 to provide forward engine thrust. Within the combustor section 30, fuel is injected into a combustion chamber 56 and mixed with the core air. This fuel-core air mixture is ignited to power the turbine engine 20. The bypass air is directed through the bypass gas path 54 and out of the turbine engine 20 through a bypass nozzle 58 to provide additional forward engine thrust. Alternatively, at least some of the bypass air may be directed out of the turbine engine 20 through a thrust reverser to provide reverse engine thrust.

Figure 2:
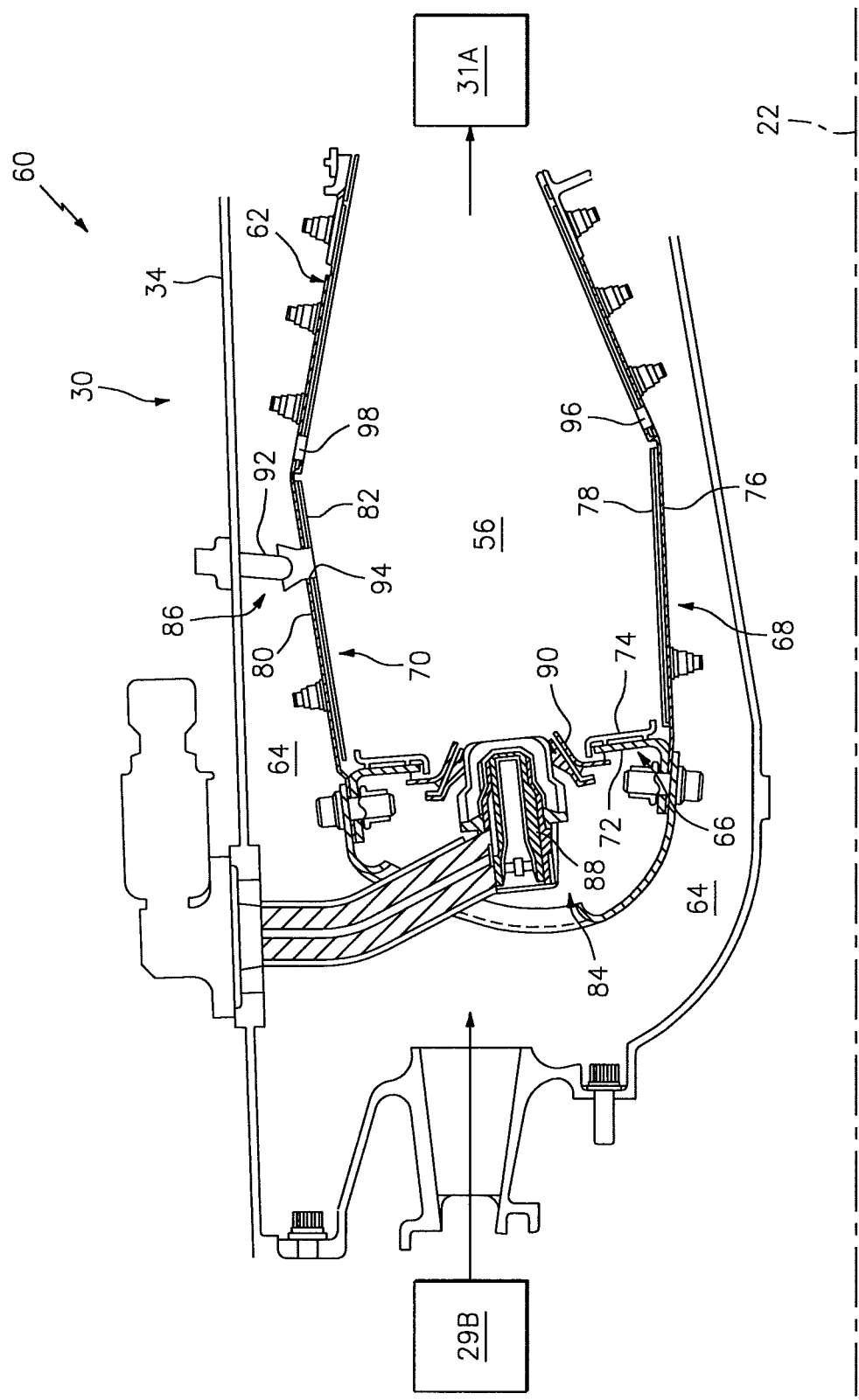
FIG. 2 partial side sectional illustration of a combustor assembly.

FIG. 2 illustrates a combustor assembly 60 for the turbine engine 20. This combustor assembly 60 includes an annular combustor 62 disposed within an annular plenum 64 of the combustion section 30. This plenum 64 receives compressed core air from the HPC section 29B, and provides the received core air to the combustor 62 as described below in further detail.

Figure 3:
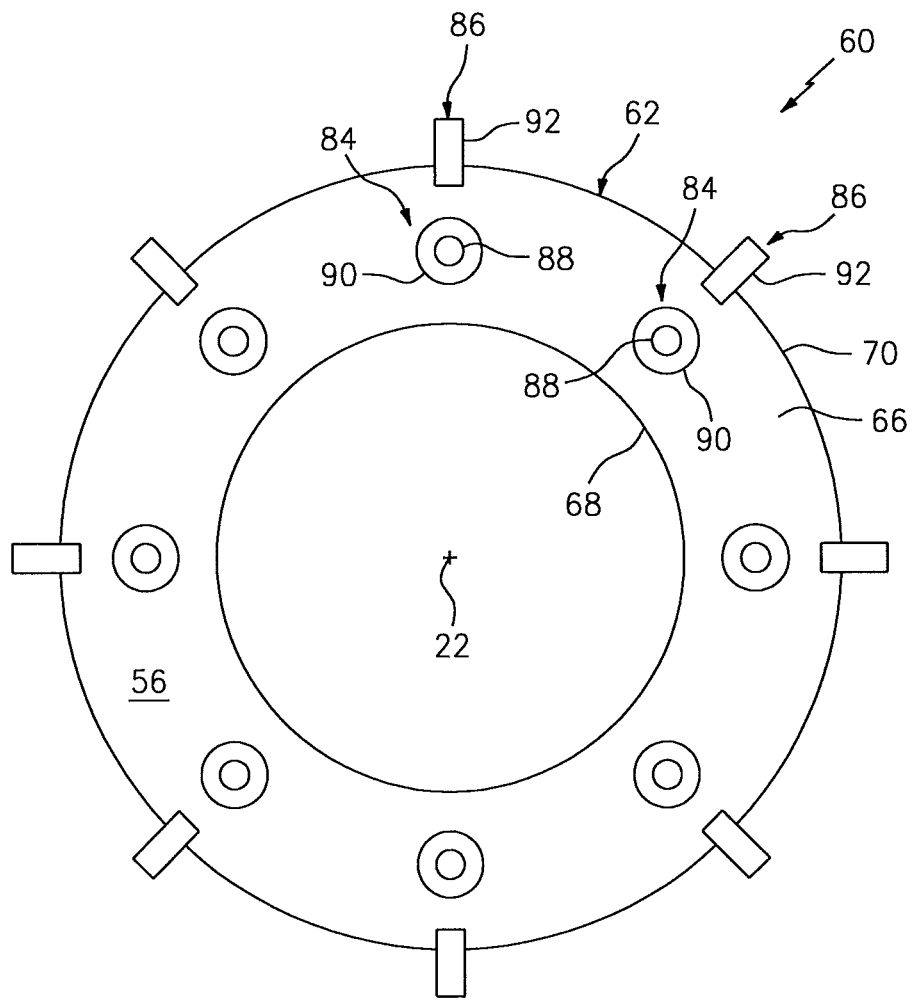
FIG. 3 is a cross-sectional illustration of a portion of a combustor assembly.

Referring to FIGS. 2 and 3, the combustor 62 includes an annular combustor bulkhead 66, a tubular combustor inner wall 68 and a tubular combustor outer wall 70. The bulkhead 66 extends radially between and is connected to the inner wall 68 and the outer wall 70 at (e.g., on, adjacent or proximate) forward ends thereof. The inner wall 68 and the outer wall 70 extend axially along the centerline 22 from the bulkhead 66 towards the HPT section 31A, thereby forming the combustion chamber 56.

The bulkhead 66, the inner wall 68 and/or the outer wall 70 may each be configured as a multi-walled structure; e.g., a hollow dual-walled structure. Referring to FIG. 2, for example, the bulkhead 66 may include an annular shell 72 and an annular heat shield 74. The heat shield 74 defines a forward end of the combustion chamber 56, and may include one or more heat shield panels. The inner wall 68 may include a tubular shell 76 and a tubular heat shield 78. The heat shield 78 defines an inner side of the combustion chamber 56, and may include one or more heat shield panels. The outer wall 70 may include a tubular shell 80 and a tubular heat shield 82. The heat shield 82 defines an outer side of the combustion chamber 56, and may include one or more heat shield panels. Alternatively, the bulkhead 66, the inner wall 68 and/or the outer wall 70 may each be configured as a single wall combustor liner.

Referring to FIGS. 2 and 3, the combustor assembly 60 also includes a plurality of upstream fuel injector assemblies 84 and a plurality of downstream fuel injector assemblies 86. Each of the upstream fuel injectors 84 may include an upstream fuel injector 88 mated with an upstream swirler 90. These fuel injectors 88 and swirlers 90 are positioned about the centerline 22 and configured with the bulkhead 66.

Each of the downstream fuel injector assemblies 86 may include a downstream fuel injector 92 mated with a downstream swirler 94. These fuel injectors 92 and swirlers 94 are positioned about the centerline 22 and configured with the outer wall 70. Referring to FIG. 2, the fuel injectors 92 and swirlers 94 may be located an axial distance from the bulkhead 66 and the upstream fuel injectors 88. This axial distance may be equal to between approximately twenty percent (~20%) and approximately seventy percent (~70%) of an axial length of the wall 70. The present disclosure, of course, is not limited to the foregoing exemplary values. Furthermore, in alternative embodiments, one or more of the downstream fuel injector assemblies 86 and, thus, fuel injectors 92 may also or alternatively be configured with the inner wall 68 in a similar manner as described herein with reference to the outer wall 70.

During operation, the upstream fuel injectors 88 inject fuel axially (e.g., along a substantial axial trajectory) into the combustion chamber 56. This injected fuel may account for between approximately twenty five percent (~25%) and approximately one hundred percent (~100%) of the fuel delivered to the combustor 62 depending upon the specific operating mode and/or conditions. The downstream fuel injectors 92 inject fuel radially (e.g., along a substantial radial trajectory) into the combustion chamber 56. This injected fuel may account for up to approximately seventy five percent (~75%) of the fuel delivered to the combustor 62 depending upon the specific operating mode and/or conditions. Note, the downstream fuel injectors 92 may not be operational (i.e., inject fuel) during all modes of turbine engine operation. The present disclosure, of course, is not limited to the foregoing exemplary values.

The swirlers 90 direct core air from the plenum 64 into the combustion chamber 56 in a manner that facilitates mixing the core air with the fuel injected from the upstream fuel injectors 88. The swirlers 94 direct core air from the plenum 64 into the combustion chamber 56 in a manner that facilitates mixing the core air with the fuel injected from the downstream fuel injectors 92. One or more igniters (not shown) and/or other ignition sources (e.g., pilot flames) ignite the fuel-core air mixture. Quench apertures 96 and 98 (see FIG. 2) in the combustor walls 68 and 70 direct additional core air into the combustion chamber 56 to quench (e.g., stoichiometrically lean) the ignited fuel-core air mixture. Still additional core air may be directed into the combustion chamber 56 through cooling apertures (not shown) in the combustor walls 68 and 70 for (e.g., film) cooling the walls 68 and 70; e.g., the heat shields 78 and 82.

The swirlers 90 may deliver between approximately twenty percent (~20%) and approximately eighty percent (~80%) of the core air to the combustor 62. The swirlers 94 may deliver between approximately twenty percent (~20%) and approximately eighty percent (~80%) of the core air to the combustor 62. The quench apertures 96 and 98 may deliver up to approximately fifteen percent (~15%) of the core air to the combustor 62. However, in some embodiments, the quench apertures 96 and 98 may be omitted. The liner cooling apertures (not shown) in the inner and/or the outer walls 68 and 70 may deliver up to approximately thirty percent (~30%) of the core air to the combustor 62. The present disclosure, of course, is not limited to the foregoing exemplary values.

In the combustor assembly 60 embodiment of FIG. 3, the upstream fuel injectors 88 and the downstream fuel injectors 92 are arranged in similar equi-spaced patterns. Furthermore, each of the downstream fuel injectors 92 is circumferentially aligned with a respective one of the upstream fuel injectors 88. With this configuration, thermoacoustic instabilities may arise within the combustion chamber 56 under certain conditions when acoustic modes couple with unsteady heat released due to combustion in a positive feedback loop. These instabilities may lead to relatively large pressure oscillations inside of the combustion chamber 56, thereby affecting combustor 62 stable operation and potentially causing structural damage to the combustor 62 components. Examples of such thermoacoustic instabilities include, but are not limited to, "screech" instabilities and "howl" instabilities. Additional details regarding thermoacoustic instabilities are disclosed in U.S. Pat. No. 8,037,688 to Hagen et al., which is hereby incorporated herein by reference in its entirety.

Figure 4:
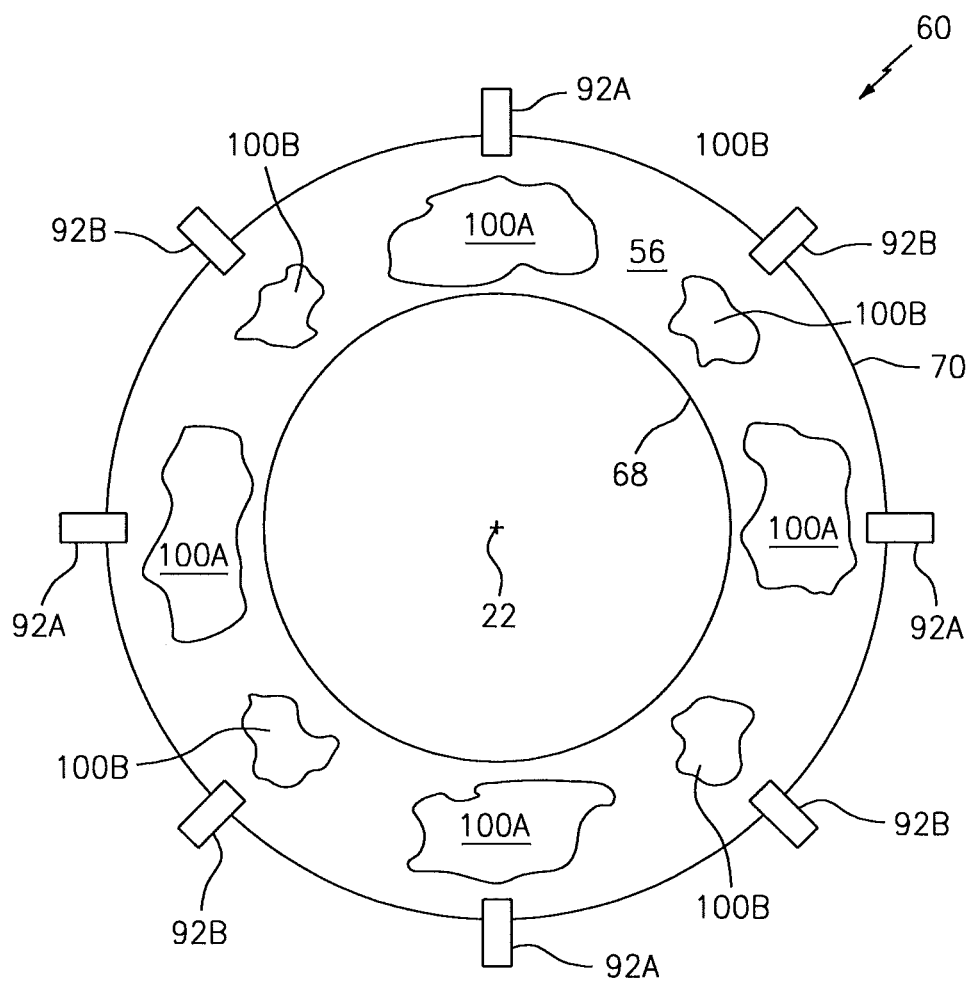
FIG. 4 is a cross-sectional illustration of the combustor assembly portion of FIG. 3 during engine operation.

Thermoacoustic instabilities may be reduced or eliminated, however, by tailoring how fuel is injected into the combustion chamber 56 by the downstream fuel injectors 92. For example, referring to FIG. 4, a first set of the fuel injectors 92A may be adapted to inject the fuel into the combustion chamber 56 at a first rate. A second set of the fuel injectors 92B may be adapted to inject the fuel into the combustion chamber 56 at a second rate different than the first rate, where one of the fuel injectors 92B is circumferentially between each adjacent pair of the fuel injectors 92A.

With the foregoing configuration, the downstream fuel injectors 92 (e.g., 92A and 92B) inject the fuel unevenly into the combustion chamber 56. This uneven injection of fuel in turn may create a plurality of different (e.g., circumferentially fluctuating) flame zones 100 within the combustion chamber 56. For example, the fuel injectors 92A may be associated with relatively strong (e.g., high temperature) flame zones 100A due to their relatively high fuel injection rate. The fuel injectors 92B may be associated with relatively weak (e.g., low temperature) flame zones 100B due to their relatively low fuel injection rate. These different flame zones 100A-B may have different thermoacoustic properties and thereby act to dissipate, or at least not contribute to, propagation of the thermoacoustic instabilities within the combustion chamber 56.

Figure 5:
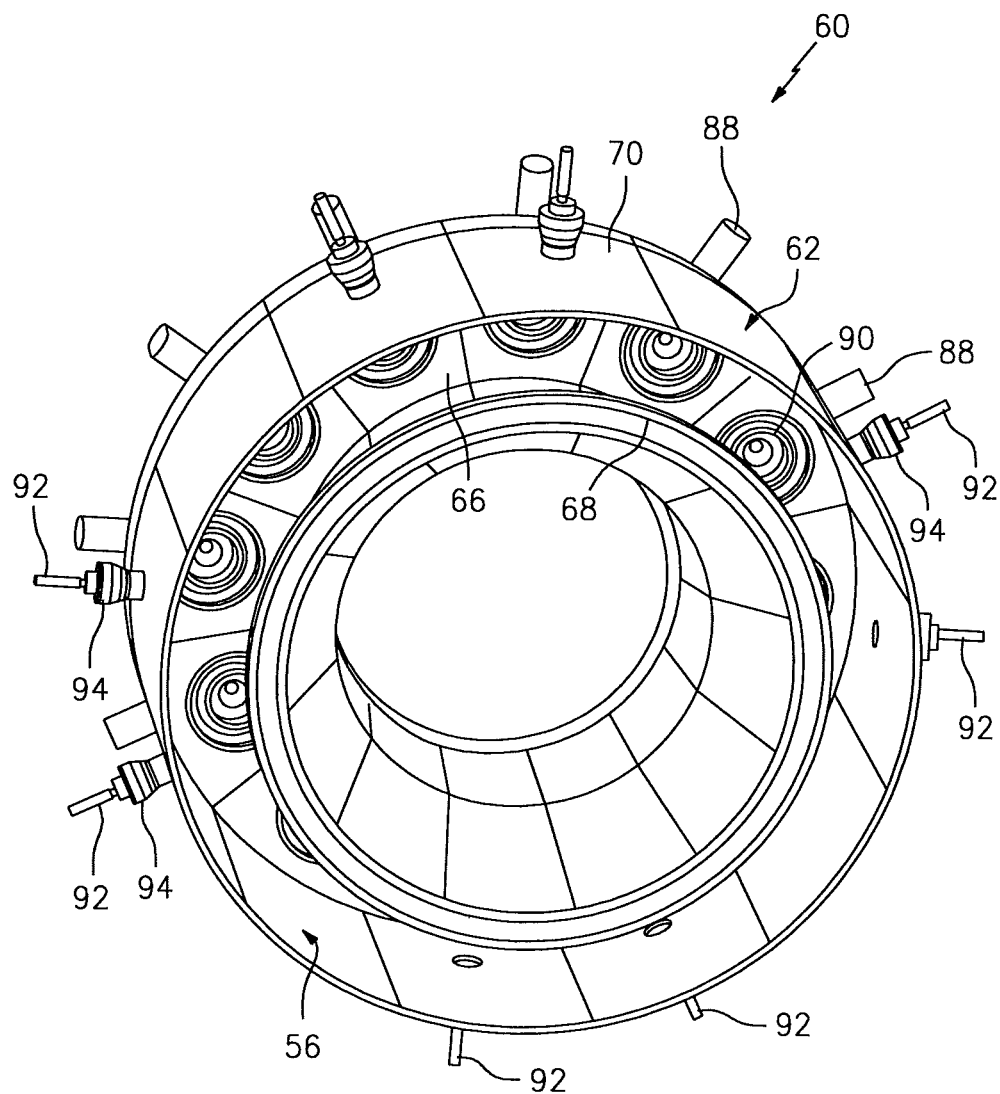
FIG. 5 is a perspective cross-sectional illustration of a portion of another combustor assembly.
Figure 6:
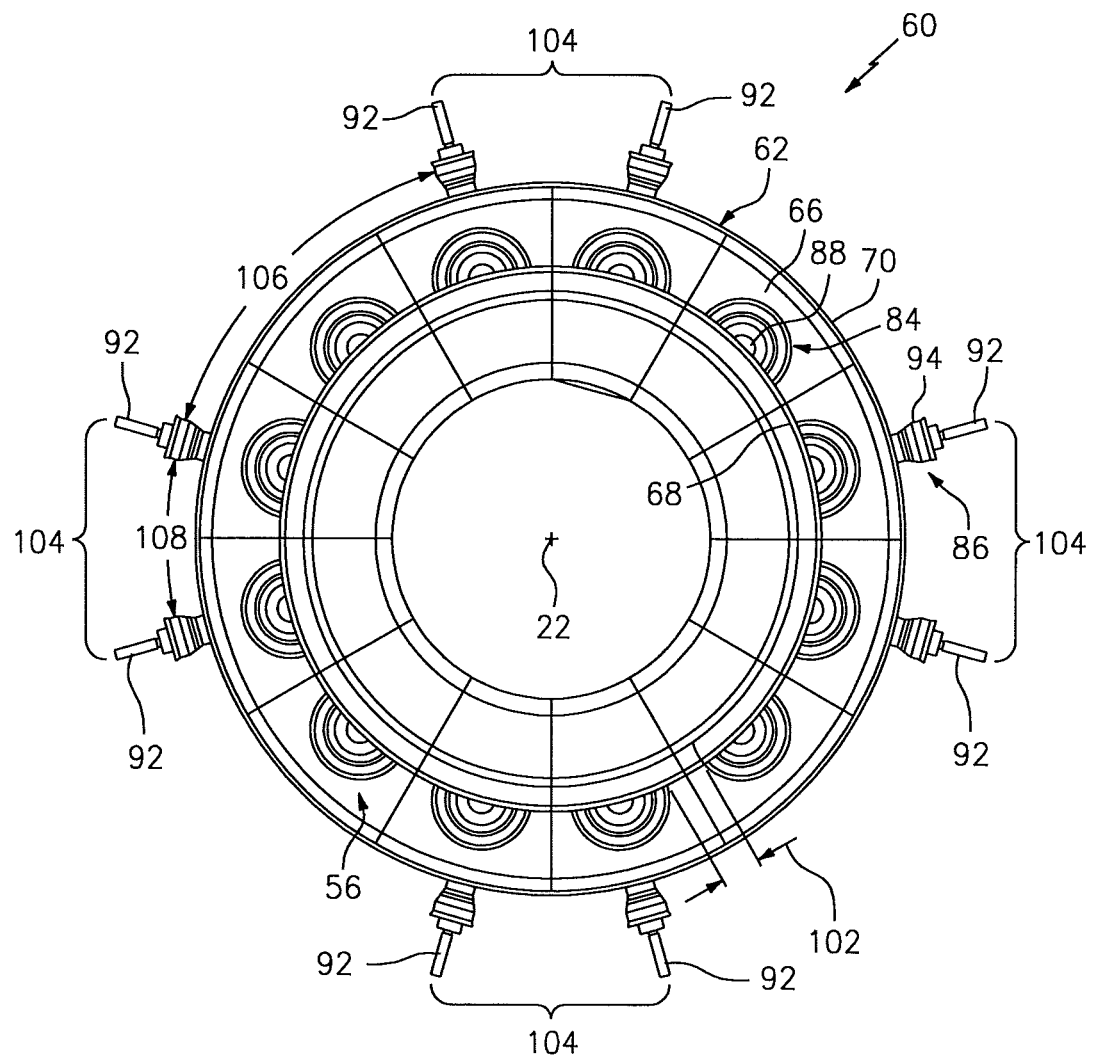
FIG. 6 is a cross-sectional illustration of the combustor assembly portion of FIG. 5.

Referring now to FIGS. 5 and 6, the downstream fuel injectors 92 may also or alternatively be arranged in a unique and/or fluctuating pattern that facilitates providing the different flame zones within the combustion chamber 56. The term "fluctuating" may describe a pattern in which relative inter-object (axial, circumferential and/or radial) displacements are non-uniform. For example, inter-object circumferential displacements may be different between different adjacent pairs of the objects. In addition or alternatively, adjacent objects may be axially displaced from one another. It is also worth noting the relative inter-object displacement may repeat (e.g., the pattern may oscillate), or each relative inter-object displacement may be unique.

Referring again to FIG. 6, the upstream fuel injectors 88 may be arranged in a first pattern where the fuel injectors are equi-spaced about the centerline 22 and axially aligned with one another. More particularly, each adjacent pair of the upstream fuel injectors 88 may be separated by a substantially equal circumferential distance 102.

The downstream fuel injectors 92 of FIG. 6, in contrast, may be arranged in a second (e.g., fluctuating) pattern that is different than the first pattern. The downstream fuel injectors 92, for example, may be grouped into a plurality of multi-fuel injector sets 104; i.e., sets of at least two fuel injectors 92. Adjacent pairs of the multi-fuel injector sets 104 may each be separated by a circumferential first distance 106. Each adjacent pair of the fuel injectors 92 in each set 104 may be separated by a circumferential second distance 108 that is different (e.g., less) than the first distance 106. In addition, the quantity of the upstream fuel injectors 88 may be greater than the quantity of the downstream fuel injectors 92. In this manner, each of the downstream fuel injectors 92 may be associated (e.g., substantially circumferentially aligned) with a respective one of the upstream fuel injectors 88. One or more of the upstream fuel injectors 88, however, may also be associated (e.g., circumferentially aligned) with a respective gap between adjacent multi-fuel injector sets 104. Thus, relatively strong flame zones may be provided radially adjacent the fuel injectors 92 while relatively weak flame zones may be provided circumferentially between adjacent multi-fuel injector sets 104.

Figure 7:
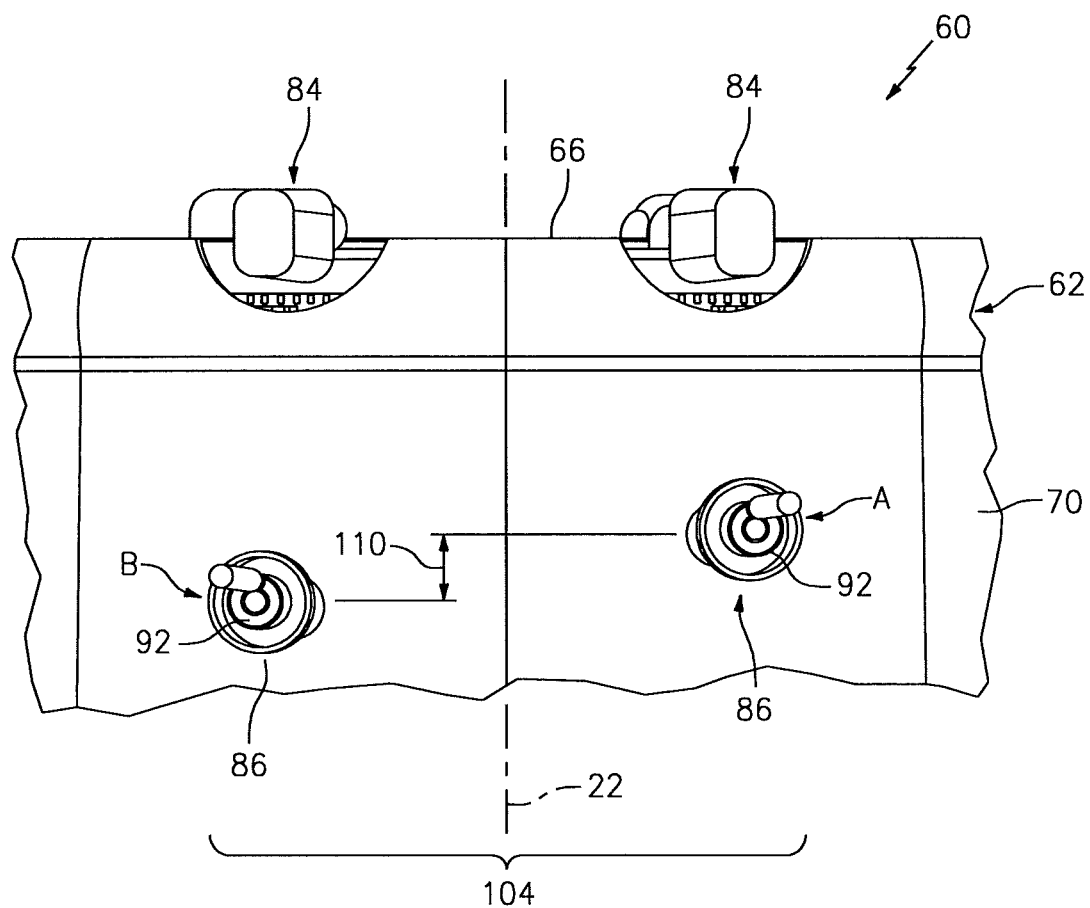
FIG. 7 is a side illustration of a portion of another combustor assembly.

The first and second patterns are described above and illustrated is FIG. 6 as having different relative circumferential inter-injector spacing schemes. However, referring now to FIG. 7, the first and the second patterns may also or alternatively be "axially" different. For example, a first of the fuel injectors 92 in each set may be located at an axial position A along the centerline 22 while a second of the fuel injectors 92 in each set may be located at another axial position B along the centerline 22; e.g., the fuel injectors 92 are axially offset from one another by an axial distance 110. This type of axial spacing scheme may also or alternatively be utilized to change flame zone intensities and/or positions within the combustion chamber 56 and thereby reduce or eliminate thermoacoustic instabilities. Alternatively, of course, the downstream fuel injectors 92 may be axially aligned with one another.

Figure 8:
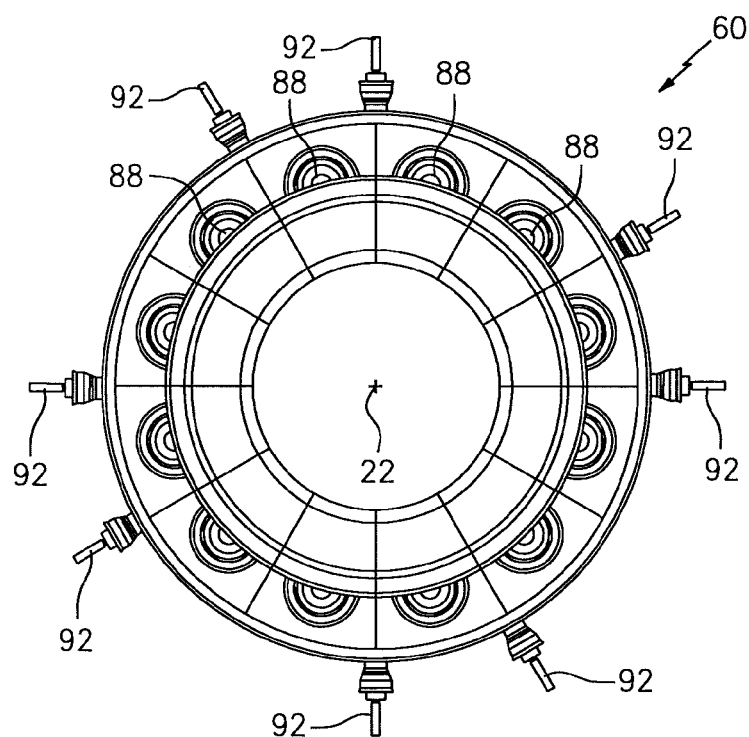
FIGS. 8-11 are respective cross-sectional illustrations of portions of still other combustor assemblies.
Figure 9:
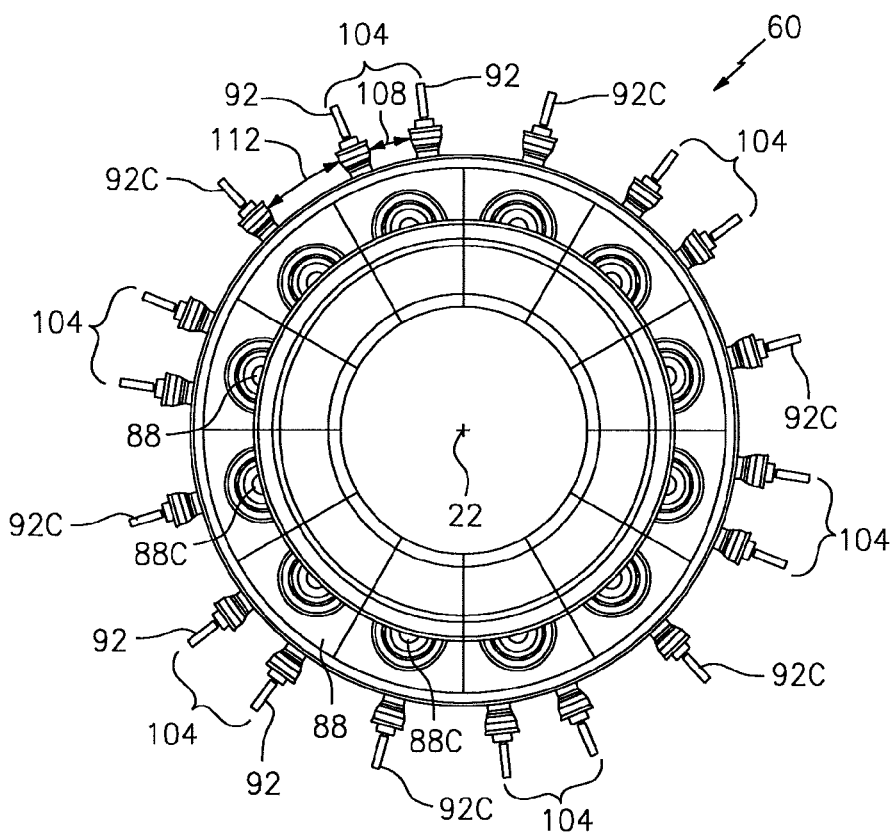
Figure 10:
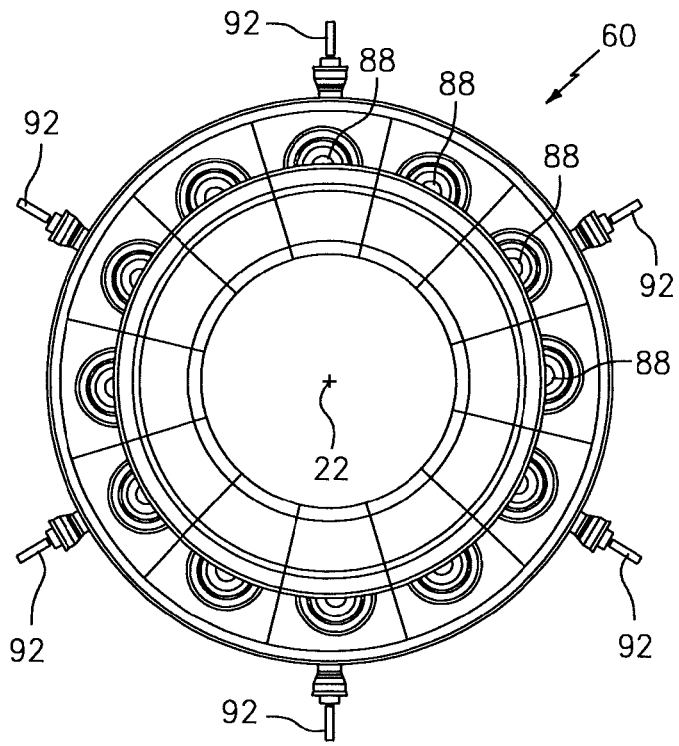
Figure 11:
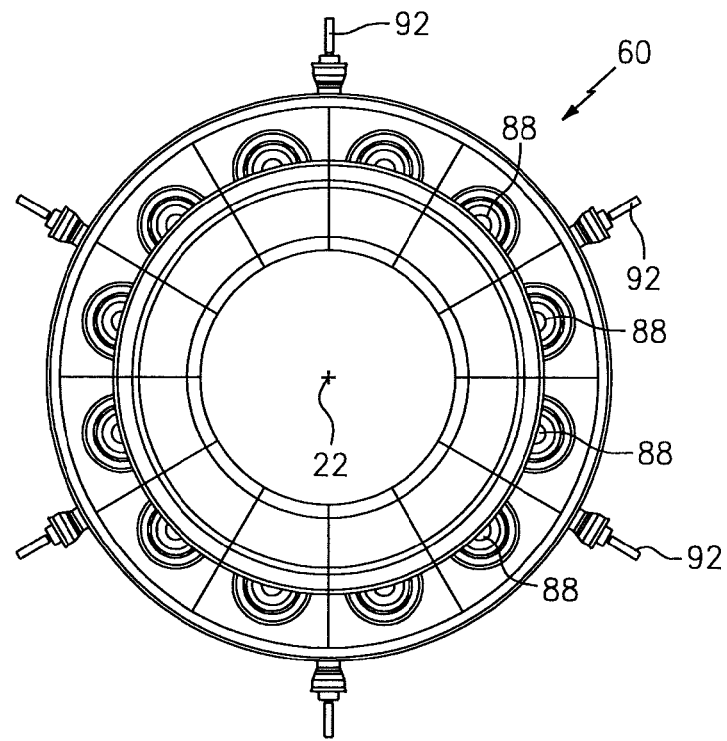

The downstream fuel injectors 92 may be arranged in various circumferential and/or axial patterns other than those described above. For example, referring to FIG. 8, each downstream fuel injector 92 may associated with a respective gap between adjacent upstream fuel injectors 88. More particularly, each downstream fuel injector 92 may be circumferentially positioned between a respective adjacent pair of the upstream fuel injectors 88. Referring to FIG. 9, each multi-fuel injector set 104 may be associated (e.g., circumferentially aligned) with a respective one of the upstream fuel injectors 88. However, at least one downstream fuel injector 92C may be circumferentially positioned between adjacent multi-fuel injector sets 104, and circumferentially aligned with a respective one of the upstream fuel injectors 88C. In addition, a circumferential distance 112 between each fuel injector 92C and an adjacent one of the fuel injectors 92 in a respective set 104 may be different (e.g., greater) than the circumferential second distance 108. Referring to FIGS. 10 and 11, the downstream fuel injectors 92 may be equi-spaced about the centerline 22. In contrast to FIG. 4, however, the downstream fuel injectors 92 are aligned with only some (e.g., ever-other one) of the upstream fuel injectors 88 (see FIG. 10), or alternatively only some (e.g., ever-other one) the inter-injector 88 gaps (see FIG. 11). The present disclosure therefore is not limited to the downstream fuel injector arrangements disclosed herein.

In some embodiments, one or more of the downstream fuel injectors 92 may be configured with the combustor 62 without a swirler (e.g., the swirler 94). Thus, these fuel injector(s) 92 may inject fuel into the combustion chamber 56 without provision of additional core air from the plenum 64.

In some embodiments, the combustor assembly 60 may include one or more additional downstream fuel injectors and/or fuel injector assemblies. These additional fuel injectors and/or assemblies may be located axially between the fuel injectors 88 and 92 and/or downstream of the fuel injectors 92.

The distances between objects (e.g., injectors, injector assemblies, injector sets, etc.) are described above and illustrated in the drawings as measuring gaps between the respective objects. However, in alternate embodiments, one or more of the distances may alternatively be measured between centroids of the objects.

The terms "upstream", "downstream", "inner" and "outer" are used to orientate the components of the combustor assembly 60 described above relative to the turbine engine 20 and its centerline 22. A person of skill in the art will recognize, however, one or more of these components may be utilized in other orientations than those described above. The present invention therefore is not limited to any particular combustor assembly spatial orientations.

The combustor assembly 60 may be included in various turbine engines other than the one described above. The combustor assembly 60, for example, may be included in a geared turbine engine where a gear train connects one or more shafts to one or more rotors in a fan section, a compressor section and/or any other engine section. Alternatively, the combustor assembly 60 may be included in a turbine engine configured without a gear train. The combustor assembly 60 may be included in a geared or non-geared turbine engine configured with a single spool, with two spools (e.g., see FIG. 1), or with more than two spools. The turbine engine may be configured as a turbofan engine, a turbojet engine, a propfan engine, or any other type of turbine engine. The present invention therefore is not limited to any particular types or configurations of turbine engines.

While various embodiments of the present invention have been disclosed, it will be apparent to those of ordinary skill in the art that many more embodiments and implementations are possible within the scope of the invention. For example, the present invention as described herein includes several aspects and embodiments that include particular features. Although these features may be described individually, it is within the scope of the present invention that some or all of these features may be combined with any one of the aspects and remain within the scope of the invention. Accordingly, the present invention is not to be restricted except in light of the attached claims and their equivalents.

What is claimed is:

1. An assembly for a turbine engine, the assembly comprising:
    an annular combustor with a combustion chamber extending circumferentially around and axially along a centerline;
    the annular combustor including a plurality of first fuel injectors and a plurality of second fuel injectors disposed about the centerline;
    wherein the first fuel injectors are adapted to inject fuel axially into the combustion chamber;
    wherein the second fuel injectors are adapted to unevenly inject fuel radially into the combustion chamber, a first adjacent pair of the second fuel injectors are circumferentially separated by a first distance, and a second adjacent pair of the second fuel injectors are circumferentially separated by a second distance that is different than the first distance; and
    wherein each of the second fuel injectors is circumferentially aligned with a respective one of the first fuel injectors.

2. The assembly of claim 1, wherein
    one of the second fuel injectors is adapted to inject fuel into the combustion chamber at a first rate; and
    another one of the second fuel injectors is adapted to inject fuel into the combustion chamber at a second rate that is different than the first rate.

3. The assembly of claim 1, wherein the first adjacent pair of the second fuel injectors are axially separated by a third distance.

4. The assembly of claim 1, wherein one of the first fuel injectors is circumferentially aligned with a gap between the second adjacent pair of the second fuel injectors.

* * * * *